United States Patent [19]
Wilke

[11] 3,881,512
[45] May 6, 1975

[54] HYDRAULIC CONTROL VALVE AND PRESSURE COMPENSATING MECHANISM THEREFOR

[75] Inventor: Raud A. Wilke, Brookfield, Wis.

[73] Assignee: Koehring Company, Milwaukee, Wis.

[22] Filed: Sept. 21, 1973

[21] Appl. No.: 399,527

[52] U.S. Cl. .............................. 137/596.13; 91/446
[51] Int. Cl. ........................ F15b 11/08; F16k 11/10
[58] Field of Search .......... 137/596.13, 596.12, 117, 137/118, 116, 116.3, 596, 625.69, 115, 116.5, 613, 614, 614.19, 504, 503, 501; 91/468, 444, 437, 446

[56] References Cited
UNITED STATES PATENTS

| | | |
|---|---|---|
| 3,411,416 | 11/1968 | Herd et al. ....................... 91/468 X |
| 3,465,519 | 9/1969 | McAlvay et al. ........... 137/596.13 X |
| 3,602,104 | 8/1971 | Stremple ..................... 137/596.13 X |
| 3,718,159 | 2/1973 | Tennis ............................. 137/596.12 |

Primary Examiner—Martin P. Schwadron
Assistant Examiner—Robert J. Miller
Attorney, Agent, or Firm—James E. Nilles

[57] ABSTRACT

A multi-spool hydraulic control valve, wherein each control spool has its own pressure compensating valve mechanism. A valve plunger in each such mechanism is operable to regulate flow of inlet fluid to feeder and bypass ports in response to variations in the pressure differential across its ends. Inlet fluid flows to the feeder port through a check valve controlled passageway in the interior of the plunger. The pressure compensating plunger associated with one of the downstream control spools can function to govern fluid flow to a motor port governed by an upstream spool.

17 Claims, 10 Drawing Figures

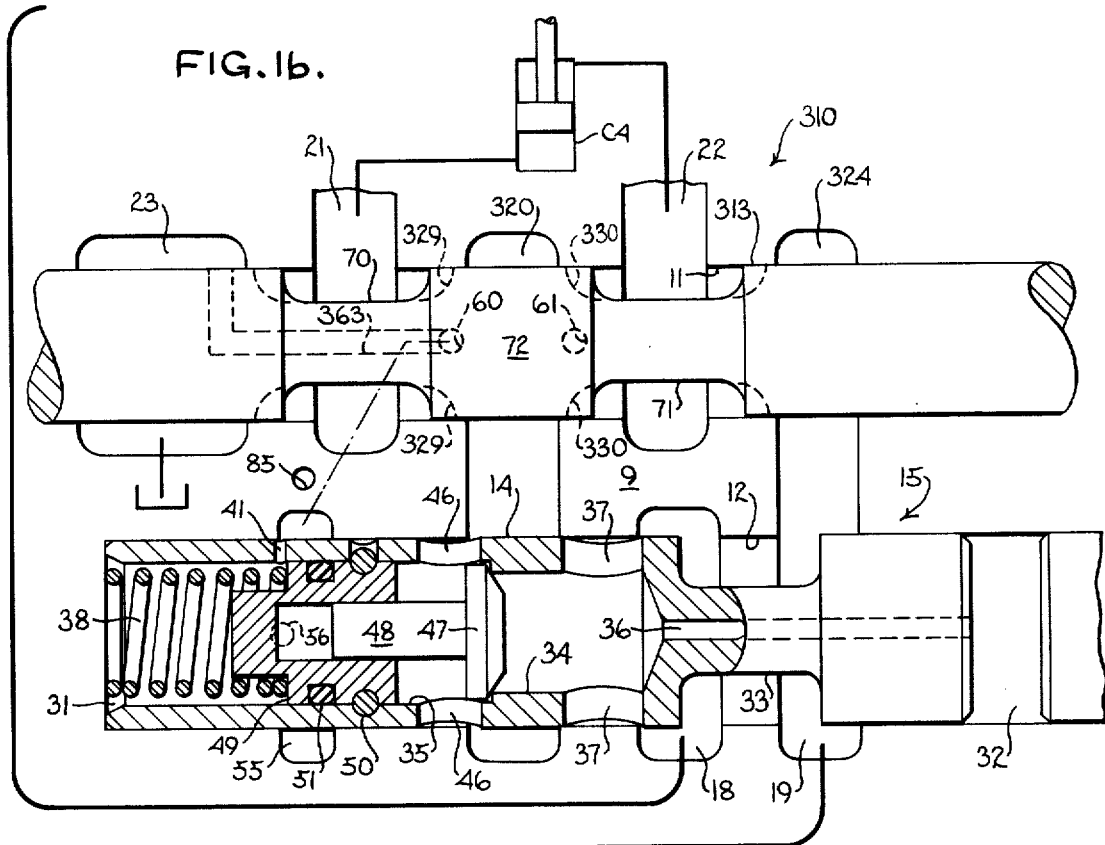

HYDRAULIC CONTROL VALVE AND PRESSURE COMPENSATING MECHANISM THEREFOR

This invention relates to fluid flow control instrumentalities, and has more particular reference to hydraulic control valves such as are equipped with pressure compensating valve mechanism by which the flow of pressure fluid from a source to a point of use can be maintained at a substantially constant rate.

Pressure compensated valve mechanisms of the type herein concerned are commonly used wherever it is necessary to accurately control both the speed and the direction of operation of a fluid motor.

One of the main objectives of this invention resides in the provision of improved pressure compensating valve mechanisms which can be advantageously used with hydraulic control valves.

Most hydraulic control valves are provided with load holding check valve means to prevent accidental descent of the load on the governed motor or cylinder during shifting of the control spool toward an operating position from a neutral or hold position, or due to pump failure during raising of the load. In many such control valves presently in use, load holding check valves are provided for each service port of the valve. Thus, in such a control valve intended to govern a reversible fluid motor, for instance a double acting cylinder, two check valves were required for the service ports of the valve.

An example of a hydraulic control valve having but one load holding check valve to serve both service ports governed by each spool of the valve can be seen in U.S. Pat. No. 2,873,762 issued Feb. 17, 1959. However, an open center single spool valve of that patent, for control of a double acting cylinder, had to be constructed in a special way to provide it with passageways opening to its valve chamber at least at eight axially spaced locations. Thus, while it was possible to save the expense of one of the two check valves customarily used prior to the advent of the valve of U.S. Pat. No. 2,873,762, much of the saving was offset by the increased costs of coring and the special metals used in the large valve spools and bodies required for the common check valve construction.

With this in mind, it is a more specific object of the invention to provide a pressure compensating valve mechanism which can be used with a control valve for a double acting cylinder or the like, and which itself embodies a load holding check valve to obviate the need for one or more check valves in the body of the control valve. One of the main advantages of this invention thus can be said to be that it enables the control valve with which it is used to be constructed with a much simpler passage arrangement and with considerable reduction in body size and length of valve spools.

Another purpose of the invention is to so improve the construction of pressure compensated control valves of the character described that parallel, series-parallel and or series type valves can be embodied in a single control valve assembly.

With these observations and objectives in mind, the manner in which the invention achieves its purposes will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of the embodiments of the invention constructed according to the best modes so far devised for the practical application of the principles thereof, and in which:

FIG. 1 is a more or less diagrammatic view of a pressure compensated control valve of this invention;

FIGS. 1a and 1b together diagrammatically portray a sectional control valve comprised of a stack of four control sections, each equipped with a compensating valve mechanism of this invention;

FIG. 2 is a sectional view taken on the line 2—2 in FIG. 1a;

Figure 1:
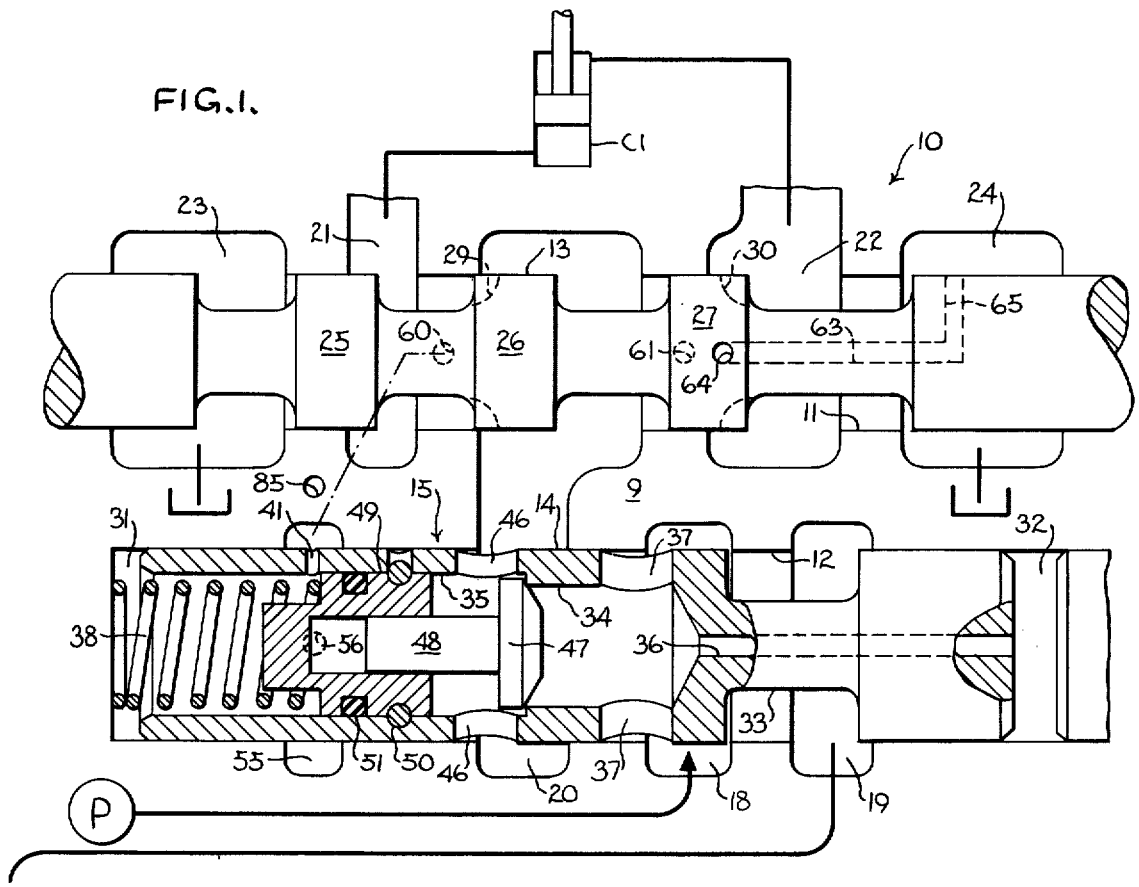
Figure 6:
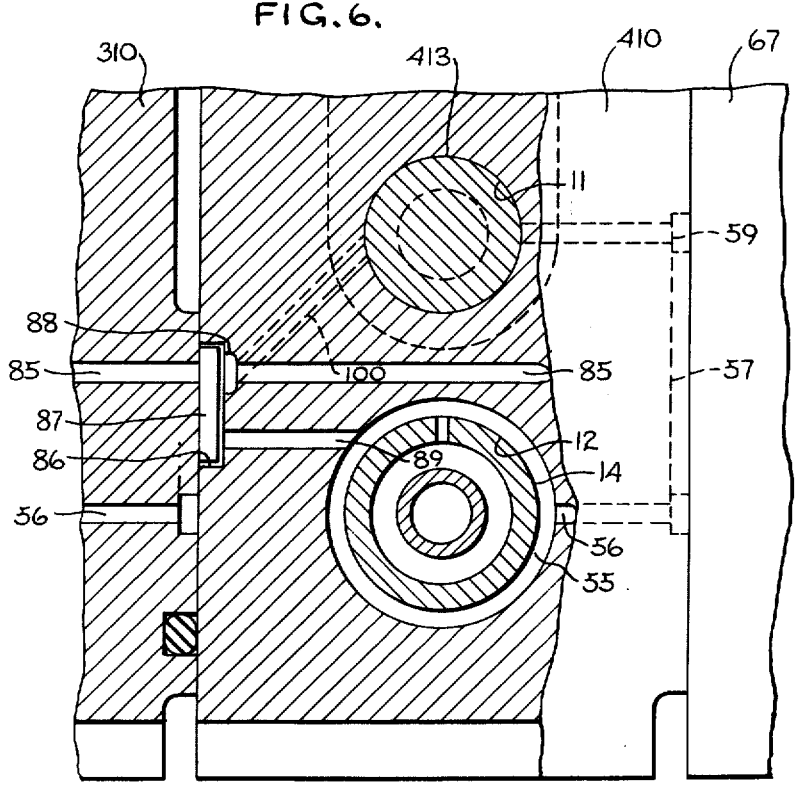
FIg. 6 is a fragmentary sectional view similar to FIG. 4, but illustrating details of construction of the final valve section of FIG. 1b.

Referring now to the accompanying drawings, and particularly to FIg. 1, the numeral 10 generally designates a pressure compensated series - parallel type of control valve for governing the speed and direction of operation of a reversible hydraulic motor, here shown by way of example as a double acting lift cylinder C1. The valve is mounted in a body 9 having parallel upper and lower bores 11 and 12, respectively, and it can comprise one of the control sections of a stack thereof.

A valve spool 13 is axially slidably received in the upper bore 11 to govern the operation of the cylinder C1; while the plunger 14 of a pressure compensating valve mechanism 15 is axially slidably received in the lower bore 12 to govern flow of pressure fluid from an inlet 18 to either an outlet passage 19 or to a feeder passage 20, or to divide the flow of inlet fluid to both. The latter two passages open to the bore 12 at axially opposite sides of the inlet passage 18, and the feeder passage 20 also extends up to and intersects the bore 11 in which the valve spool 13 operates.

A pair of service passages 21, 22 open to the bore 11 at axially opposite sides of the feeder passage 20, and merely for purposes of illustration, the service passage 21 has been shown connected with the head or load raising port of the cylinder C1 while the service passage 22 has been shown connected with the rod or load lowering port of the cylinder.

A pair of exhaust or return passages 23, 24 join with the bore 11 at zones axially outwardly of the service passages 21, 22, respectively.

The valve spool 13 is provided with four axially spaced circumferential grooves which define three spaced apart lands 25, 26 and 27 at locations inwardly of the full diameter end portions of the spool. These lands are located to isolate the service passages 21, 22 from the return passages 23, 24 and from the feeder passage 20 in the neutral or hold position of the valve spool.

When the spool is shifted to a full operating position to the right of neutral, it provides for flow of pressure fluid from the feeder passage 20 to service passage 21 and thus to the head port of cylinder C1 to effect raising of a load thereon. At the same time, it provides for flow of fluid expelled from the rod port of the cylinder to service passage 22, which is then in communication with the return passage 24. These flow conditions are reversed when the valve spool 13 is shifted to a full operating position to the left of neutral.

It will be noted that the two lands 26 and 27 on the valve spool are normally disposed to lie at opposite sides of the junction of the feeder passage 20 with the bore 11 containing the valve spool. The remote faces of loads 26 and 27 are provided with throttle notches 29 and 30, respectively, to facilitate operation of the cylinder over a range of slow speeds at times when the valve spool 13 is shifted part-way toward either full operating position, as for example to the slow lift position seen in FIG. 1. In that position, pressure fluid from the feeder passage 20 is constrained to flow to the service passage 21 in a limited amount, through the throttle notches 29. The throttle notches 30 similarly limit flow of pressure fluid to the rod end of the cylinder when the valve spool is shifted to a metering or slow lower position to the left of neutral.

As is customary, the bore 12 for the pressure compensating valve mechanism is closed at its opposite ends to define actuating chambers 31 and 32 at the left and right hand ends, respectively of the compensating plunger 14. The plunger has a single substantially medial circumferential groove 33 therein, located just inwardly of a bore 34 in the left hand portion of the plunger. The bore 34, in turn, opens leftward to the pressure chamber 31 through a counterbore 35 in the plunger. The bore 34 is communicated with the pressure chamber 32 at the other end of the plunger through an axial passage 36 therein.

The groove 33 in the plunger is adapted to fully communicate the inlet passage 18 with the outlet passage 19 in an extreme left hand or bypass position of the plunger defined by its engagement with the closed left hand end of the bore 12. At that position of the plunger, all of the fluid entering the inlet from the pump P flows unrestrictedly to the outlet 19 to thus effectively unload the pump.

That pump unloading position of the compensating plunger 14 is the one it is caused to occupy when the valve spool 13 is in its neutral position. At that time, the pressure of fluid in the inlet 18 is manifested in chamber 32 via passage 36 in the plunger and diametrically opposite holes 37 in the wall of the plunger opening to the bore 34 therein and to the inlet 18. Such pressure in chamber 32 exerts axial force on the plunger to move it to its left hand limit of motion.

When the plunger is in its right hand limit of motion defined by its engagement with the closed right hand end of the bore 12, it completely blocks off communication between the inlet 18 and the outlet 19, and thus closes the bypass. A compression spring 38 in the pressure chamber 31 acts upon the compensating plunger to urge it toward that bypass closing position.

In any metering position of the valve spool 13, such as the slow lift position shown in FIG. 1, only a small part of the pump output flows to the head port of the cylinder C1 (via feeder passage 20, throttle notches 29 and service passage 21), while excess pump fluid flows to the outlet 19 from the inlet 18 via the circumferential groove 33 in the compensating plunger. In that position of the valve spool, pump fluid entering the bore 34 from the inlet travels along a flow path leading to the feeder passage 20 through diametrically opposite holes 46 in the wall of the counterbored portion of the compensating plunger. To do so, however, inlet fluid must act upon a check valve 47 located in said flow path and move it off of an annular valve seat formed at the junctions of bore 34 and counterbore 35. The check valve closes, of course, whenever fluid pressure is higher in the feeder passage 20 than in the inlet 18. Since the feeder passage 20 is common to and feeds both service passages 21, 22, it will thus be apparent that the check valve 47 also serves both service passages.

The check valve 47 is provided with a stem 48 which is axially slidably received in the bore of a valve guide member 49, and the latter is anchored to the plunger in the counterbore 35 as at 50. An O-ring seal 51 confined in a circumferential groove in the valve guide member prevents leakage flow of pressure fluid in either axial direction along the exterior of the guide member. It should be noted that the guide member 49 also provides a seat for the inner end of the plunger spring.

From the description thus far, it will be seen that the check valve 47 lies in the path of pressure fluid flowing to either service passage 21, 22, to thus serve as a load holding check valve for both service passages. In this way, the need for separate check valves for the service passages is obviated, and there is no need for the separate U-shaped feeder-connected transfer passage in the valve body, for example, in single load check control valves of the type forming the subject matter of the aforementioned U.S. Pat. No. 2,873,762. As a result, the valve body can be made considerably smaller and at less expense than was possible in most pressure compensated control valve mechanisms available heretofore.

The purpose of the compensating valve mechanism 15 is to accurately maintain the governed cylinder C1 in operation at a selected speed corresponding to the metering setting of the valve spool 13; and to do so regardless of variations in either the load on the cylinder or in the pressure of supply fluid entering the inlet 18. It is able to perform in this manner because it is adapted to divide or proportion the flow of supply fluid in precise amounts between the feeder passage 20 and the outlet 19, in accordance with variations in the pressure drop across the selected (active) throttle notches 20 or 30 in any metering position of the valve spool. Stated in another way, the compensating plunger can be said to be automatically adjustable in response to differences in pressure across its ends to maintain a uniform pressure drop across the active throttle notches which corresponds to the desired speed of cylinder operation as determined by the metering setting of the valve spool 13.

From this it will be seen that the pressure compensating plunger acts to vent more or less of the supply fluid from the inlet 18 to outlet passage 19 in accordance with variations in the pressure drop across the active throttle notches when the valve spool is in its slow lift position seen in FIG. 1. The pressure of pump or supply fluid sensed in the bore 34 inside the compensating plunger, at the upstream side of the active throttle notches 29, is imposed upon the right hand end of the plunger in chamber 32 and tends to urge it to the left, to increase communication between the inlet 18 and bypass port 19 through the circumferential groove 33 in the plunger. At the same time, the pressure of supply fluid sensed at the service passage 21, at the downstream side of the active throttle notches 29, is imposed on the opposite end of the plunger in the spring chamber 31, through a feedback port 41 in the plunger, and acts thereon together with the force of the spring 38 to urge the plunger to the right, toward a position limiting flow of supply fluid from the inlet 18 to the outlet 19 in byass relation to the fender passage 20. In this way, the compensating plunger controls the pressure in the feeder passage 20.

The compensating plunger will be axially adjusted to whatever position effects a balance between the forces on its opposite ends, and at which position the pressure drop across the throttle notches is at a value which can be said to correspond to the desired speed of motor operation as determined by the metering setting of the control spool.

Any increase in the load on the governed motor being supplied with fluid from service passage 21 tends to raise the pressure therein and to also reduce the speed of motor operation from that desired. Accordingly, the pressure in the service passage 21 and thus also in the actuating chamber 31 will increase relative to the pressure in the actuating chamber 32. The compensating plunger 14 will respond to this increase in the pressure differential across its ends and will be moved thereby to the right to decrease the amount of supply fluid allowed to flow from inlet 18 to the bypass port 19. This will correspondingly increase fluid pressure in the feeder passage 20 until the desired pressure drop between the upstream and downstream sides of the active throttle notches 29 has been restored.

Any decrease in the load on the governed fluid motor being supplied with fluid from the service passage 21 tends to increase the speed of motor operation from that desired and to correspondingly decrease the pressure in service passage 21. The pressure of fluid in the actuating chamber 31 will be decreased accordingly, and will thus effect a decrease in the pressure differential across the ends of the compensating plunger. This will cause the plunger to be shifted toward the left, to increase bypass flow of supply fluid from the inlet 18 to the outlet 19 by whatever amount will restore the pressure drop across the active throttle notches 29 that exists when the motor is operating at the desired speed.

The compensating plunger 14 will operate in the same fashion at times when the valve spool 13 occupies a metering position to the left of neutral, and pressure fluid flows from feeder passage 20 to the governed motor C1 through throttle grooves 30 and service passage 22.

It is important to note, however, that in each case, supply fluid flowing to the selected service passage must unseat the check valve 47 in the compensating plunger before it can enter the feeder passage 20 for flow to one or the other of the service passages. The feeder passage, of course, is common to both service passages, as is the check valve 47. As a result, a single load holding check valve located in a passageway through the interior of the compensating plunger 14 is able to prevent back flow of pressure fluid toward the inlet 18 from either service passage in communication therewith.

As stated earlier, the pressure of supply fluid in either service passage 21 or 22 is manifested in the actuating or spring chamber 31 of the pressure compensating valve mechanism through the feedback port 41. The feedback port 41 is located in the wall of the tubular portion of the compensating plunger 14 so as to open to spring chamber 31 and to be in register with an enlargement 55 of the bore 12 in any position of the plunger.

Figure 2:
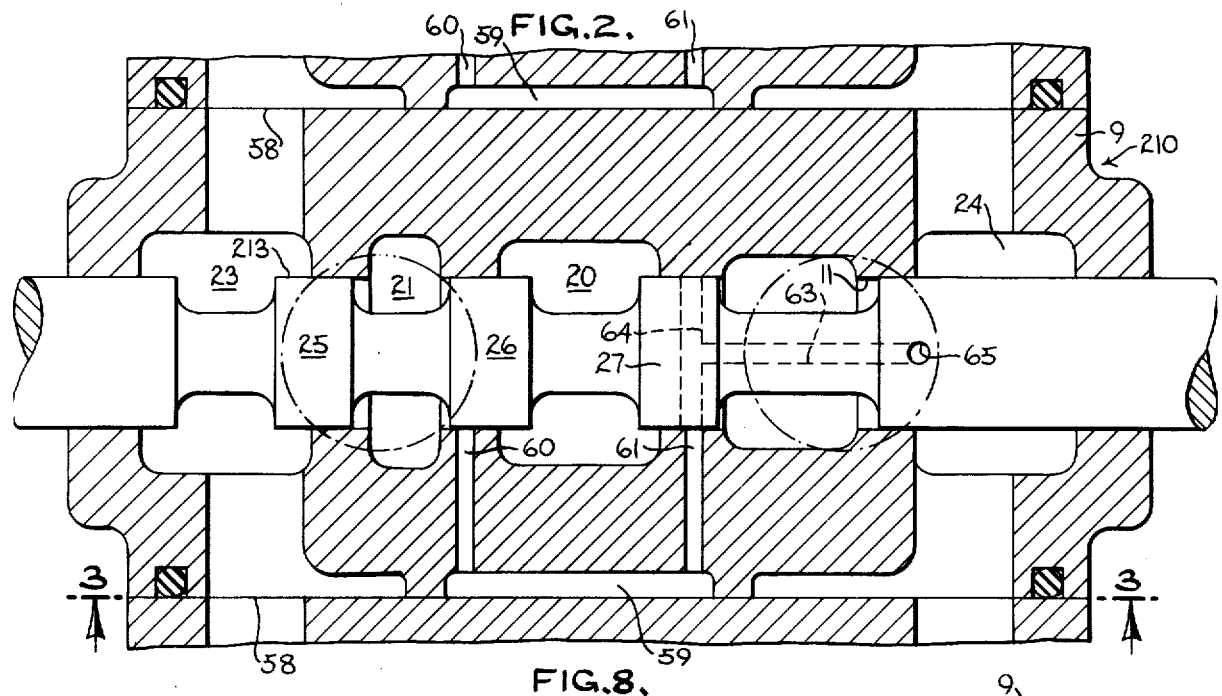
Figure 3:
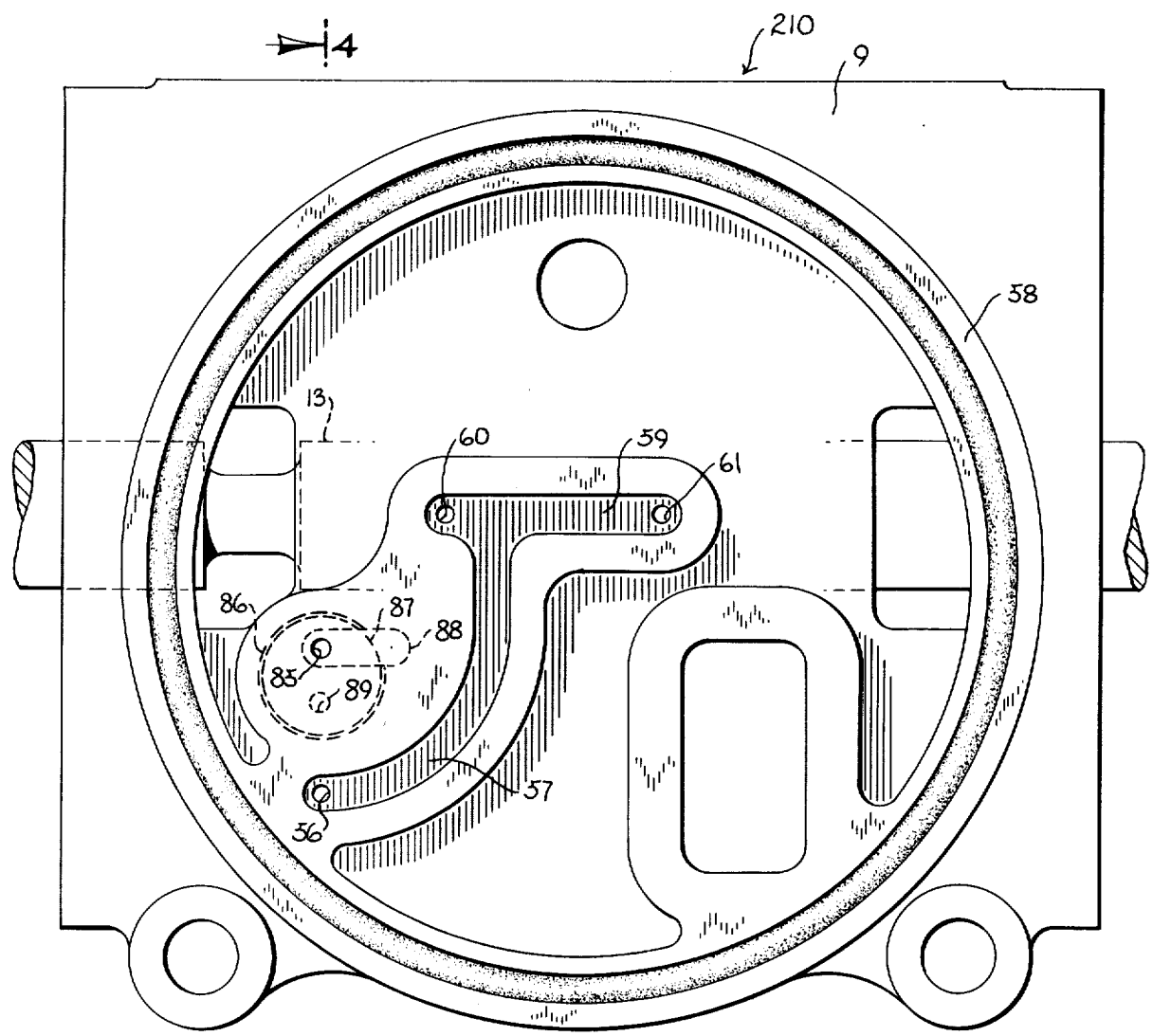
FIG. 3 is a downstream face view of one of the control sections taken on the line 3—3 in FIG. 2.
Figure 5:
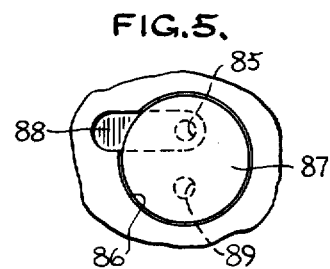
FIG. 5 is a fragmentary upstream face view of the control section seen in FIG. 3, taken substantially on the line 5—5 in FIG. 4.
Figure 4:
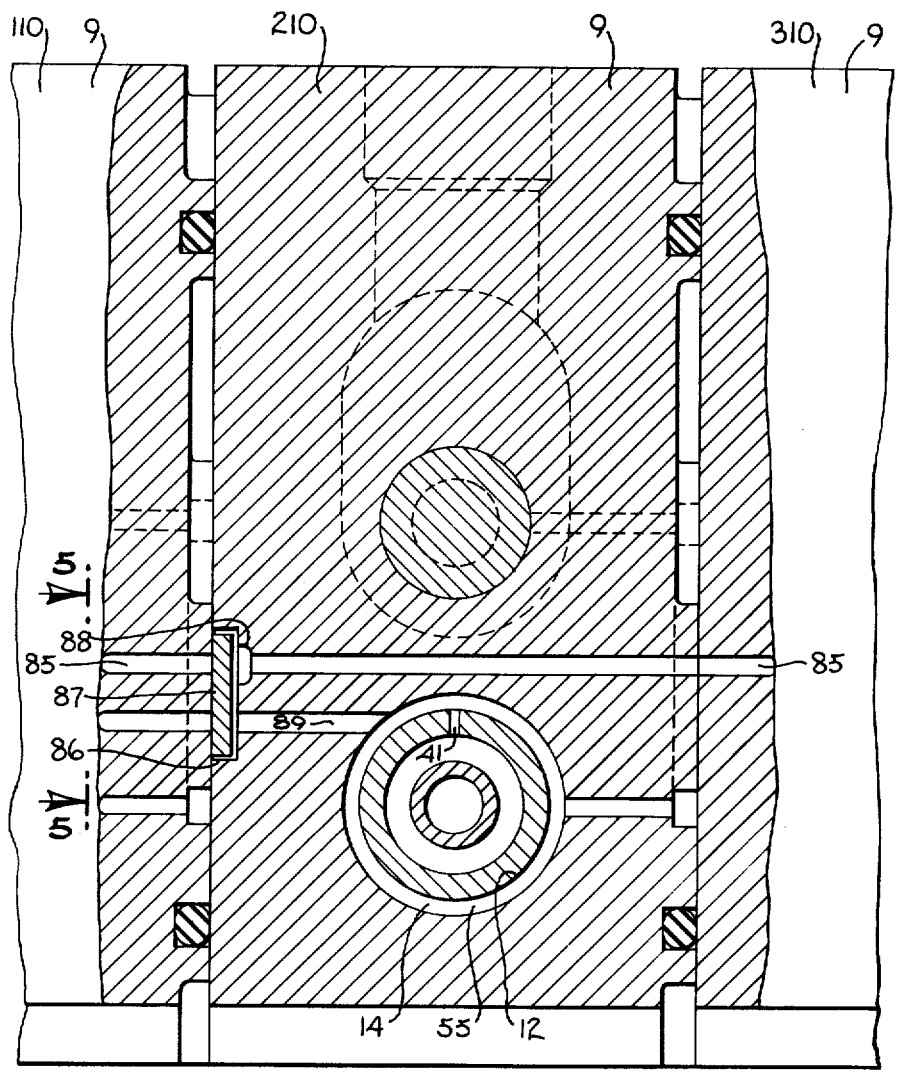
FIG. 4 is a sectional view taken on the line 4—4 in FIG. 3.

One end of a hole 56 in the valve body communicates with the enlargement 55, and its other end opens to one end of an arcuate groove 57 in the finished surface portion at the downstream face 58 of the body 9 (see FIG. 3). The other end of the arcuate groove 57 communicates with a straight groove 59 that extends lengthwise of the axis of the valve spool 13 and directly opposite the latter in said downstream finished surface portion 58 of the body. A pair of holes 60 and 61 (see FIG. 2) drilled radially into said downstream face of the section from locations near the end portions of the groove 59, communicate with the bore 11 at locations spaced outwardly from its junction with the feeder passage 20 and normally covered by the lands 26 and 27 on the spool 13 in the neutral position thereof.

In said right hand metering position of the spool, its land 27 closes off the inner end of the hole 61, while the adjacent land 26 uncovers the hole 60. In this way, the feedback port 41 is communicated with the service passage 21 through the hole 60, grooves 59 and 57, and the hole 56 which opens to bore enlargement 55.

In the left hand metering position of the valve spool, its land 26 will close off the inner end of the hole 60, while the other hole 61 will be uncovered by the land 27 to then communicate the service passage 22 with the feedback port 41 via grooves 57 and 59 in the downstream face 58 of the valve body, and hole 56 therein.

It is also important to note that the spring chamber 31 must be vented to tank in the neutral position of the valve spool 13 at which its lands 26 and 27 respectively close off the holes 60 and 61. For that purpose, the control spool is provided with a venting passageway having an axial branch 63 therein, and radial branches 64 and 65 which open to the periphery of the spool at axially spaced locations. These radial branches 64, 65 are so located that the radial branch 64 of the venting passageway will have communication with the hole 61 and hence face groove 59 in only the neutral position of the control spool at which the other radial branch 65 of the venting passageway will be in open communication with the exhaust passage 24. As soon as the valve spool is shifted to an operating position, the holes 61 and 64 are no longer in register, and the spring chamber 31 is then subjected to the pressure in the one or the other of the service passages 21 or 22.

Since only the spring 38 acts upon the compensating plunger tending to move it in the bypass closing direction in the neutral position of the valve spool, that force will be readily overcome by the force which supply fluid from inlet 18 exerts upon the plunger so that the latter will be normally held by the pressure of such supply fluid on its right hand end in a bypass open position allowing all of the incoming supply fluid in port 18 to flow to the outlet 19. The compensating valve mechanism thus serves as an efficient pump unloading mechanism in the neutral position of the valve spool 13.

Figure 1A:
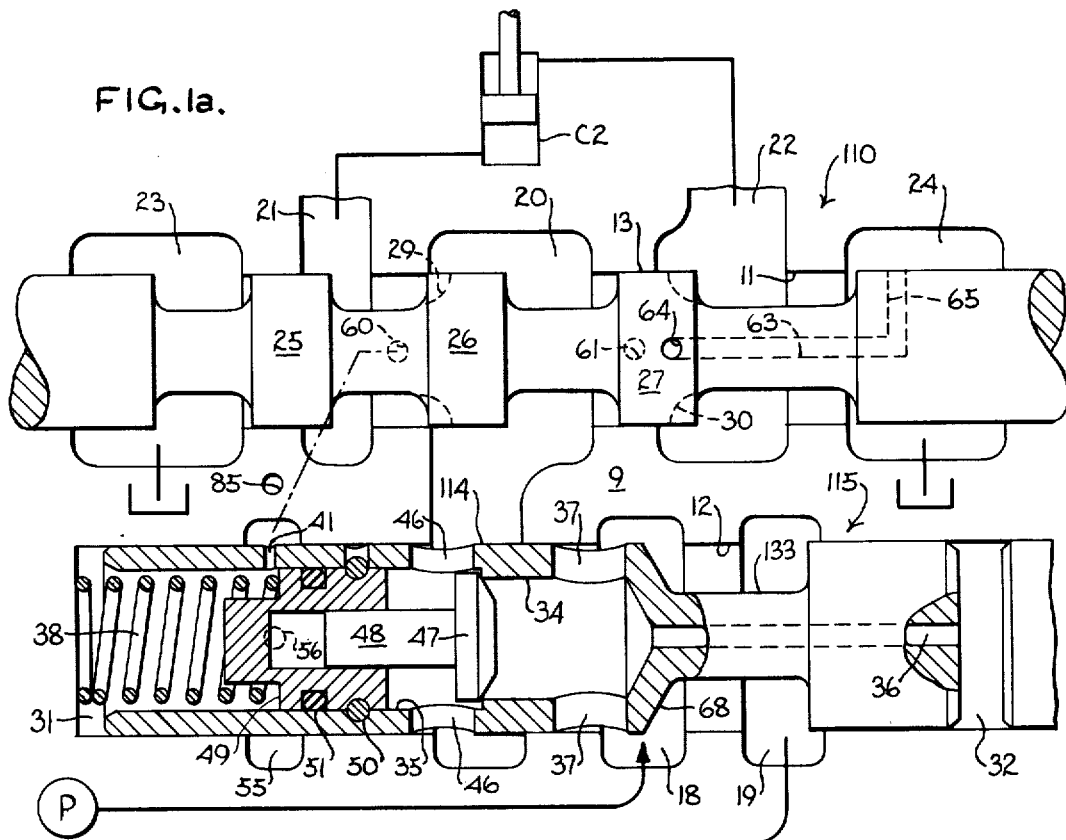
Figure 1A:
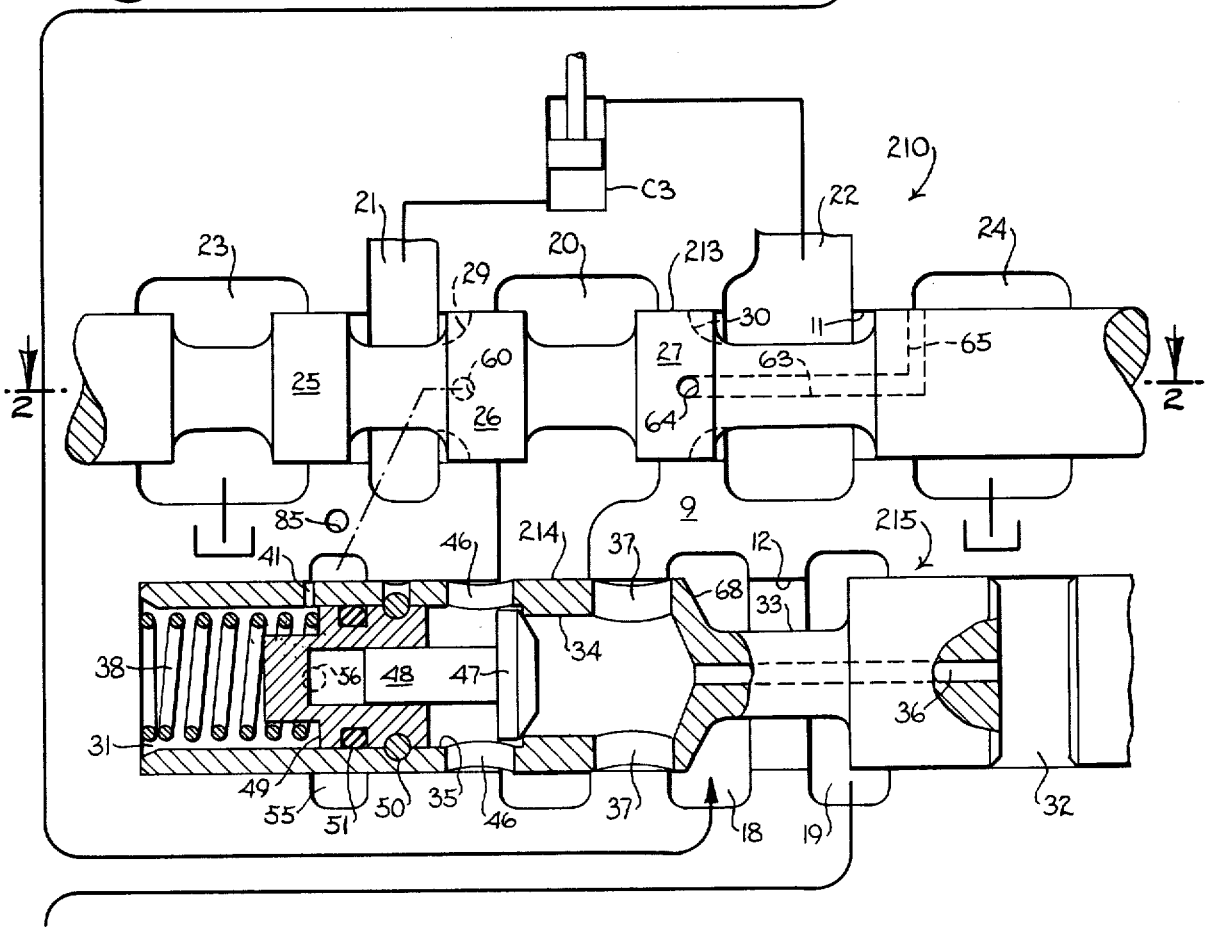
Figure 7:
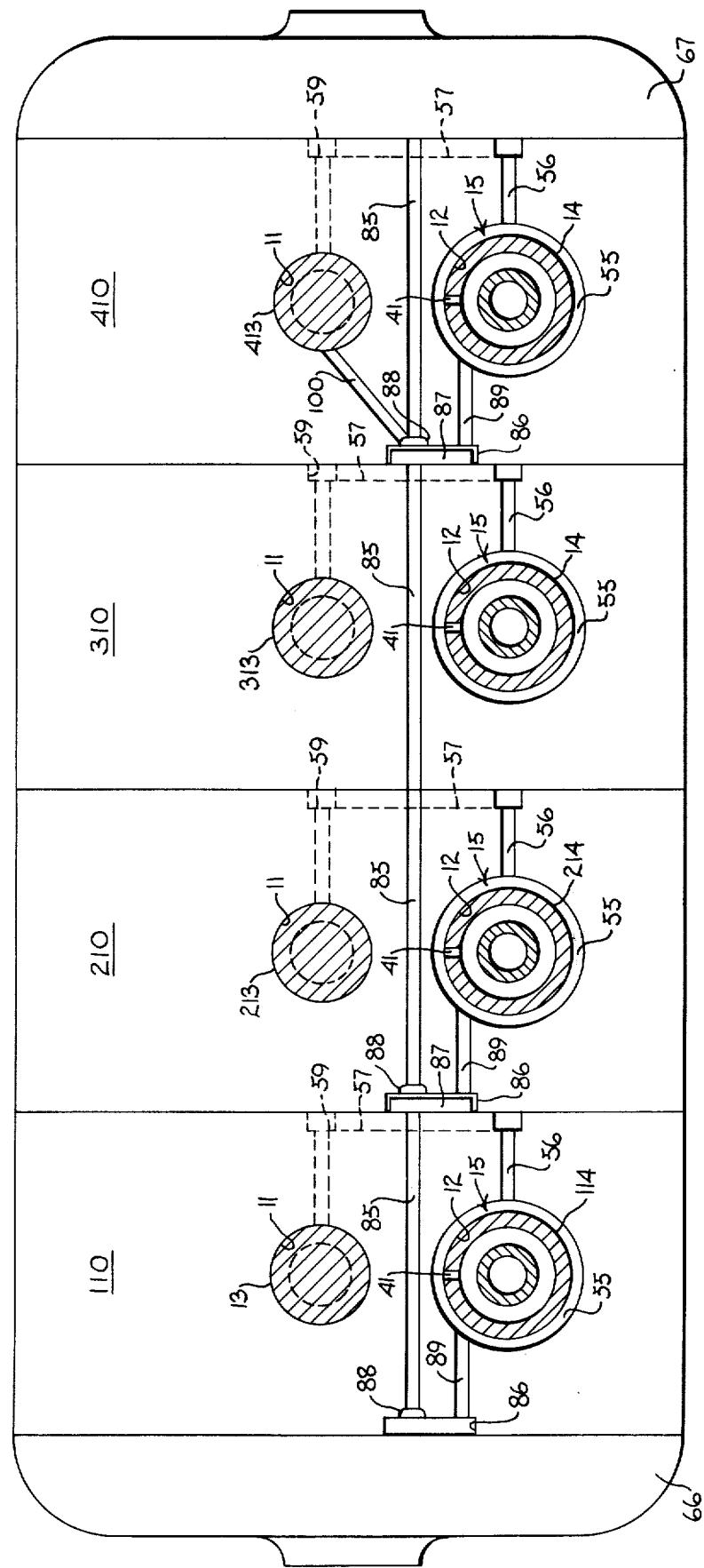
FIG. 7 is a diagrammatic view looking at the bank of sections from one end of their valve spools.

FIGS. 1a and 1b and 7 together diagrammatically illustrate a multi-sectional control valve embodying the principles of this invention, and comprising four superimposed control sections arranged in a bank between inlet and outlet end sections 66 and 67, respectively.

The upstream control section 110 in the bank may control a double acting lift cylinder C2, and is substantially a duplicate of the control valve of FIG. 1. Its only difference is that its compensating valve mechanism 115 is provided with a plunger 114 having a circumferential groove 133 shaped to adapt the control section for parallel circuit operation. In contrast, the compensating plunger in the valve of FIG. 1 adapts the valve for seriesparallel operation.

For parallel operation, the shoulder 68 at the left hand end of its circumferential groove 133 is of frustoconical shape to thus make said groove much wider at the periphery of the spool. Accordingly, the compensating plunger 114 is incapable of closing off fluid flow from the inlet 18 of the control section to its outlet 19. This is to say, that in any operating position of the valve spool 13 in control section 110, supply pressure fluid (as from pump P) can flow into the valve inlet 18 and to the outlet 19 via the groove 133 in the compensating plunger, and into the inlet is of the adjacent downstream control section 210, for control of another double acting cylinder C3 thereby.

Metering of fluid from the inlet 18 to the feeder passage 20 is thus dependent upon the extent said passages are communicated with one another through the plunger holes 37. Fluid flow through said holes to the feeder passage will increase with movement of the plunger toward chamber 32 and will decrease with movement of the plunger toward chamber 31.

The pressure compensating mechanism 215 of the second control section 210 is also provided with a parallel type compensating plunger 214, so that the two control sections 110 and 210 can be said to be identical in every structural respect. The only difference between the two is that the valve spool 213 in control section 210 has been shown in its neutral position.

As before, pressure fluid supplied to the inlet 18 of control section 210 from outlet 19 of control section 110 is free to flow to the inlet 18 of the third control section 310 of the bank (see FIG. 1b) in any position of the valve spool in control section 210.

Though the control section 310 is equipped with the same type of compensating plunger 14 as disclosed in FIG. 1, its valve spool 313 has only two circumferential grooves 70 and 71 which normally register with the service passages 21, 22, respectively, and define a land 72 therebetween. The land 72 blocks communication between the feeder passage 320 and the service passages 21, 22 in the normal (neutral) position of the valve spool shown, while the full diameter end portions of the spool block communication between the service passages 21 and 22, and the passages 23 and 324, respectively, which receive exhaust fluid therefrom.

Thus, the passage 23 serves to receive exhaust fluid returning to service passage 21 from the head end of the governed cylinder C4 when the valve spool is in a left hand operating position at which it communicates the feeder passages 320 with service passage 22. The passage 324 receives cylinder exhaust fluid from the rod end of cylinder C4 when the valve spool is in a right hand operating position at which it communicates feeder passage 320 with service passage 21.

The passage 324, however, bridges the bores 11 and 12 in which the valve spool and compensating plunger operate. Accordingly the lower portion of passage 324 provides an outlet 19 which communicates with the inlet 18 through the circumferential groove 33 in the compensating plunger 14 when the valve spool 313 is in its neutral position shown. The outlet portion 19 of passage 324 is thus adapted for the supply of exhaust fluid from one end of the governed cylinder C4 to the inlet 18 of the final control section 410 of the bank, and it is diagrammatically shown connected thereto for that purpose.

It will thus be seen that control section 310 functions as a series-parallel valve when its spool is in a left hand operating position; and functions as a series valve when its spool is in a right hand operating position.

The compensating plunger 14 in control section 310 operates in the same manner as that in FIG. 1. That is to say that it regulates communication between the inlet 18 and outlet 19 of that section in accordance with variations in the pressure drop across the throttle notches 329 and 330 in the center land 72 of the associated valve spool 313 in any metering position of said spool.

In this case, the spring chamber 31 of the pressure compensating valve mechanism 15 is normally vented through a passageway 363 in the left hand end portion of the valve spool 313. This passageway has radial end portions which, in the neutral position of the valve spool, communicate the spring chamber 31 with the exhaust passage 23 via the hole 56 in the valve body, the grooves 57 and 59 in the downstream face of the body, and the hole 60 which then registers with the inner end portion or branch of the passageway 363.

The final control section 410 of the bank is a special one that is essential to the operation of the two parallel control sections 110, 210. It also has a pressure compensating valve mechanism 15 like that seen in FIG. 1, and a feeder passage 20 which is selectively communicable with its service passages 21 and 22 upon shifting of the associated valve spool 413 to one or the other of a pair of operating positions at opposite sides of its neutral position shown.

The valve spool 413 is quite different from those provided for the three upstream control sections in that its left hand end portion is hollow to provide an internal axial passage 75. A first set of ports 76 in the wall of the hollow end portion of the spool communicate the internal passage 75 with the feeder passage 20 in a right hand operating position of the spool and similarly communicate the internal passage with the service passage 21 in the left hand operating position of the spool.

A second set of ports 77 in the wall of the hollow end portion of the spool communicate the service passage 21 with the exhaust passage 23 via the first set of ports 76 and internal passageway 75 in the left hand operating position of the valve spool; and the ports 76 and 77 cooperate with the internal passage 75 to communicate the service passage 21 with the feeder passage in the right hand operating position of the spool.

The other service passage 22 is communicable with either the feeder passage 20 or the exhaust passage 24, depending upon which of the two described operating positions the spool is moved to. This last is made possible through the provision of a circumferential groove 78 in the valve spool.

A central land 79 on the spool normally blocks communication between the feeder passage 20 and the service passage 22, and its end which faces the groove 78 is provided with throttle notches 80 through which flow of pressure fluid from the feeder passage 20 to service passage 22 can be metered in a partial operating position of the spool at the left side of neutral. The shoulder 81 on the spool at the outer end of the groove 78 is also provided with throttle notches 82, through which flow of return fluid from service passage 22 to exhaust passage 24 can be metered in an operating position of the spool at which it is displaced less than a full stroke to the right of neutral. In this respect, it should be borne in mind that the speed at which the cylinder C5 operates can be controlled either by metering exhaust flow therefrom or by metering supply flow thereto. In either metering position of the valve spool 413, therefore, the pressure compensating mechanism 15 will function to maintain a uniform pressure drop across the active throttle notches, to keep the cylinder C5 in operation at a constant speed.

According to this invention, the pressure compensating plunger 14 in the final control section 410 is relied upon to build up operating pressure in the inlets 18 of the two parallel circuit control sections in the upper portion of the bank. This is essential, for the reason that the compensating plungers 114, 214 in control sections 110 and 210 are incapable of throttling bypass flow of inlet fluid to the outlets 19 thereof in any operating position of their respective spools.

FIG. 7 diagrammatically best illustrates the means by which the pressure compensating valve mechanism in control section 410 can be made to serve the parallel control sections 110 and 210. As therein seen, a passage 85 is formed in each control section. These passages can be said to register with one another to provide a continuous passageway which extends through the entire bank of control sections, at a location between the valve spsool of each and the enlargement 55 of the bore for its associated pressure the compensating valve mechanism. At its upstream face, each of the control sections 110, 210 and 410 is provided with a circular cavity 86.

A shuttle valve disc 87 is loosely received in the cavity 86 of the second and fourth sections 210 and 410.

The individual passages 85 in control sections 110, 210 and 410 open to the bottoms of their respective cavities through bean-shaped deepened portions 88 thereof which extend sidewise beyond the periphery of the cavity. These deepened portions are best shown in FIGS. 3 to 7.

In addition, the bodies of control sections 110, 210 and 410 are provided with substantially short passages 89. One end of each such passage 89 opens to the bottom of the cavity in its control section, while the other end of each said passage opens to the enlargement 55 of the associated pressure compensating valve bore.

With the arrangement of passages and shuttle valves described, feedback pressure in passage 85 of control section 110 can seat the shuttle valve in the downstream control section 210 in the bottom of its cavity to close off the mouth of the passage 89 therein without interfering with flow of feedback fluid to passage 85 in control section 210. Thus, feedback pressure in either parallel control section 110 or 210 can be manifested in the deepened portion 88 of the cavity in the final control section 410.

Control section 410, however, has still another drilled passageway 100 which communicates the deepened portion 88 of its cavity 86 with the bore containing the valve spool, at a location in said bore such as to be in communication with the ports 77 thereof when the valve spool 413 is in its neutral position.

To facilitate such communication, the valve spool is provided with a substantially shallow circumferential groove 101 in its periphery, to which the ports 77 open. The other ports 76 in the spool also open to a similar circumferential groove 102 which, in the neutral position of the spool, registers with the hole 60 leading to the face grooves 59, 57. Hence, it will be seen that the passageway 85 in control section 410 is in communication with the spring chamber 31 of its pressure compensating valve mechanism through the hole 100, ports 77 and the hollow interior of the associated valve spool, ports 76 and hole 60 in the valve body, the grooves 59 and 57 in the downstream face of section 410, and the hole 56 leading to the bore enlargement 55 and the feedback port 41 in the wall of the compensating plunger.

Because of the arrangement of passages in the four control sections described above, the spring chambers 31 of the pressure compensating valve mechanisms of control sections 110 and 210 can be communicated with the spring chamber of control section 410 to allow the pressure compensating plunger in section 410 to serve the two parallel control sections in a way which will now be described.

When the valve spool in control section 110 is moved to the right to a metering position such as seen in FIG. 1a, the pressure of fluid in its service passage 21 is manifested in the enlargement 55 of the bore 12 for the associated compensating plunger 114. Since bore enlargement 55 is communicated with the upper end of the passageway 85 via passage 89 and cavity 86 in section 110, pressure fluid from service passage 21 of said section will flow down through passageway 85 without interference from the shuttle valves 87, to the spring member of the compensating valve in control section 410 via the hollow portion of its spool. Even though the shuttle valves will be forced against the bottoms of their cavities by such fluid flow, the deeper portions 88 of the cavities provide bypasses around them by which the passage 85 in each control section can communicate with the corresponding passage 85 in the adjacent downstream control section.

The fluid pressure thus manifested in the spring chamber of the compensating valve in the final control section 410 will then move the compensating plunger of that section in the bypass closing direction to a position such as seen in FIG. 1b, an extent such as to cause a build-up of pressure in the inlet 18 of control section 110 to the valve necessary for the establishment of that pressure drop across the active throttle notches in the spool of control section 110 that exists when the governed cylinder C2 is operating at a speed corresponding to the metering setting of the valve spool 13 in control section 110.

The compensating plunger in control section 410 will function in the same way when the spool of the second parallel valve section 210 is moved to a metering position to one side or the other of neutral, again provided the valve spool of control section 410 is in its neutral position. However, if the valve spool in control section 410 is moved to an operating position metering fluid flow to or from the cylinder C5 governed thereby, the fluid pressure exerted on the large undersurface of its shuttle valve 87 will close off the downstream end of the passage 85 in control section 310. Consequently, the compensating plunger for control section 410 will no longer function for the two parallel valves of the bank, but will serve only to govern the speed at which cylinder C5 operates.

The shuttle valve 87 in control section 210 is essential, for example, at times when both parallel circuit control sections are in operation at the same time. If the load on the cylinder C3 governed by control section 210 is greater than the load on cylinder C2 governed by control section 110, the pressure in passage 89 of control section 210 will actuate its shuttle valve 87 away from the bottom of its cavity to a position closing off the downstream end of the passage 85 in control section 110. This will assure that the control section operating at the higher pressure will receive adequate pressure from the source for operation of the load governed thereby. This is to say that if it were not for the shuttle valves, all of the supply fluid would flow to the more lightly loaded cylinder C2, and only after that cylinder reached the end of its stroke would cylinder C3 then receive supply fluid from the source.

The shuttle valves and their associated passages make possible the provision of a multispool control valve of sectional construction as described herein, comprised of a number of parallel, series parallel or combination series and series parallel control sections arranged in random in the bank, as long as one of the special control sections 410 is placed in the bank at a location downstream from the last parallel control section.

Figure 8:
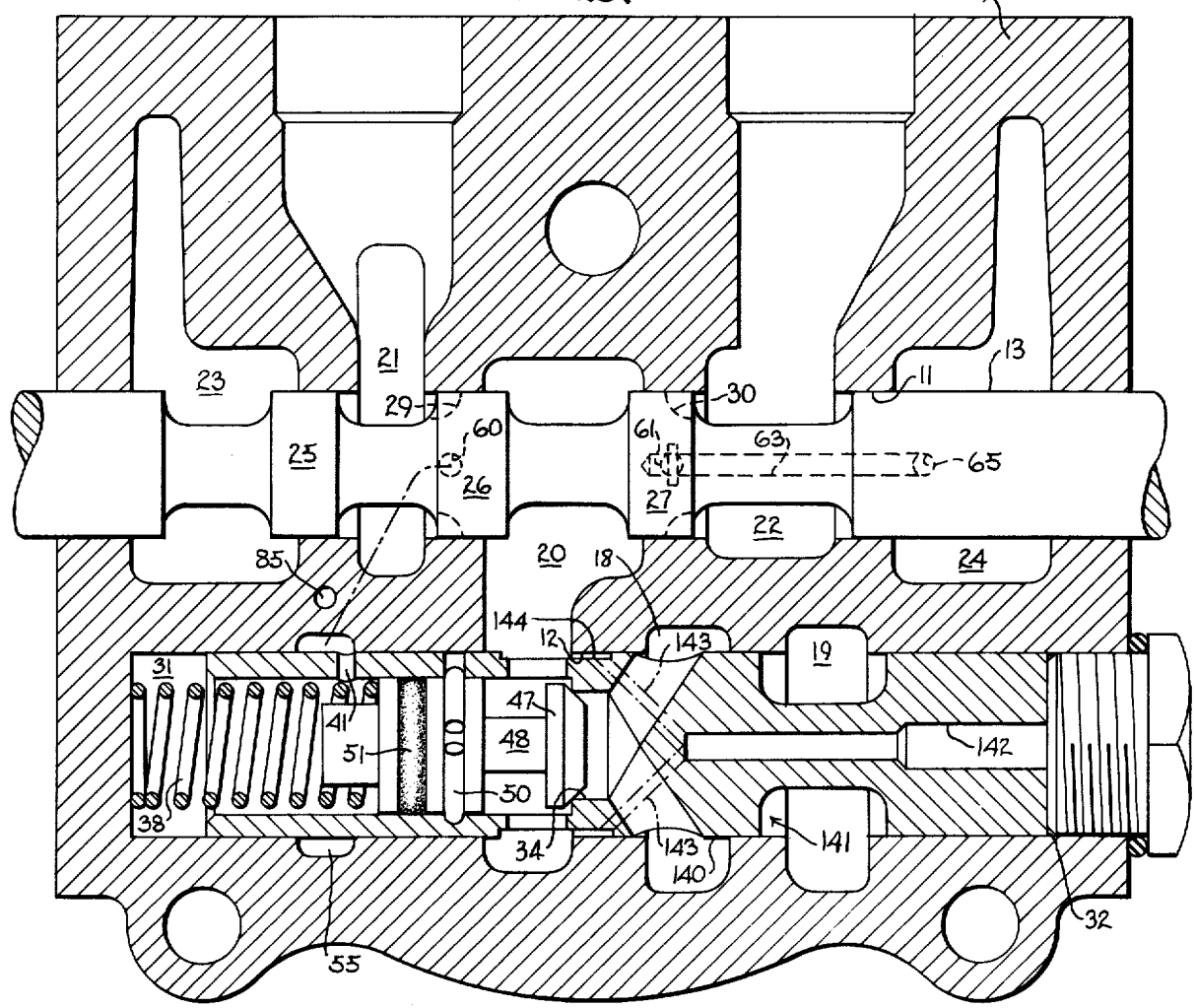
FIG. 8 is a sectional view of a control valve section like those seen in FIG. 1 but illustrating a modified form of compensating valve mechanism therefor.

Referring now to the control valve section seen in FIG. 8, it will be noted that it differs from the FIG. 1 control valve only in the way in which the pressure of inlet fluid is manifested in the pressure chamber 32 at the right hand end of the plunger 140 of its pressure compensating valve mechanism 141. For that purpose, the axial passage 142 in the plunger, which opens to chamber 32 at the right hand end of the plunger does not also open to the bore 34 therein. Instead, the inner end of passage 142 is communicated with the feeder passage 20 through angled passages 143 in the plunger. To facilitate such communication, a short length of the compensating plunger is reduced in diameter slightly, as at 144, at that area of bore 12 where the angled passages open to the periphery of the plunger.

This arrangement distinguishes the pressure compensating valve mechanism of the FIG. 8 valve from those described earlier, wherein the compensating plungers were acted upon by the pressure of inlet fluid detected in the bore 34 of the plunger and hence at a zone upstream from the load holding check valve 47.

In the FIG. 8 construction, however, the pressure of inlet fluid manifested in the pressure chamber at the right hand end of the compensating plunger is detected at a zone downstream from the load holding check valve 47 and in the feeder passage. In the absence of pump pressure in the inlet 18, the compensating plunger occupies the bypass closing position thereof shown.

From the foregoing description, together with the accompanying drawings, it will be readily apparent to those skilled in the art that this invention achieves its objectives in a most efficacious manner.

The invention is defined by the following claims:

1. A control valve having a body with inlet and feeder passage means, a pair of service passages, and a valve element having a pair of working positions at opposite sides of a neutral position at which inlet fluid flows thereacross from the feeder passage means to a selected one of said pair of service passages, characterized by:
   A. a pressure compensating valve mechanism having a fluid pressure responsive plunger to regulate such flow of inlet fluid to a selected one of the service passages via the feeder passage means in accordance with variations in the pressure differential across the valve element in a selected one of said working positions thereof;
   B. means in the plunger defining a passageway through which pressure fluid from the inlet passage means must flow in order to reach the feeder passage means, said passageway comprising a hollow portion of said plunger;
   C. a single check valve disposed in said hollow portion of said plunger and arranged to pass pressure fluid from the inlet passage means to the feeder passage means but to block reverse flow therefrom to the inlet passage means;
   D. said pressure compensating valve mechanism being located in the path along which pressure fluid flows from the inlet passage means to the feeder passage means;
   E. the plunger of said pressure compensating valve mechanism being spring urged in a direction to increase inlet fluid flow to the feeder passage means;
   F. and means providing for imposition of a fluid pressure force on the plunger which varies in accordance with the pressure of fluid in the inlet passage means and opposes said spring force on the plunger.

2. The control valve of claim 1, wherein said last named means comprises:
   A. a surface on the plunger;
   B. and means for translating the pressure of fluid in said plunger passageway into said fluid pressure force on said surface of the plunger.

3. A control valve having a body with inlet and feeder passage means, a service passage, and a valve element having a working position at which inlet fluid flows thereacross from the feeder passage means to the service passage, characterized by:
   A. a pressure compensating valve mechanism located in the path along which pressure fluid flows from the inlet passage means to the feeder passage means and having a fluid pressure responsive plunger to regulate such flow of inlet fluid to the service passage via the feeder passage means in accordance with variations in the pressure differential across the valve element in said working position thereof;
   B. means in the plunger defining a passageway, said passageway comprising a hollow portion of the plunger through which pressure fluid from the inlet passage means must flow in order to reach the feeder passage means;
   C. a check valve located in the hollow portion of said plunger and being arranged to pass pressure fluid from the inlet passage means to the feeder passage means but to block reverse flow therefrom to the inlet passage means;

D. said plunger of said pressure compensating valve mechanism being spring urged in a direction to increase inlet fluid flow to the feeder passage means;

E. means providing for imposition of a fluid pressure force on the plunger which varies in accordance with the pressure of fluid in the inlet passage means and opposes said spring force on the plunger.

F. said last named means comprising a surface on the plunger;

G. and means for translating the pressure of fluid in the feeder passage means into said fluid pressure force on the plunger.

4. A control valve having a body with inlet and feeder passage means, a service passage, and a valve element having a working position at which inlet fluid flows thereacross from the feeder passage means to the service passage, characterized by:

A. a pressure compensating valve mechanism having a fluid pressure responsive plunger to regulate such flow of inlet fluid to the service passage via the feeder passage means in accordance with variations in the pressure differential across the valve element in said working position thereof;

B. means in the plunger defining a passageway, said passageway comprising a hollow portion of the plunger having axially spaced inlet and outlet ports in the wall of said hollow plunger portion to respectively communicate with the inlet and feeder passage means;

C. a check valve being located in said hollow portion of the plunger for engagement with an annular seat in said passageway, coaxial therewith, and being arranged to pass pressure fluid from the inlet passage means to the feeder passage means but to block reverse flow therefrom to the inlet passage means;

D. a first surface on the plunger upon which pressure fluid from the inlet passage means exerts force tending to move the plunger in one direction to effect reduction in flow of fluid from the inlet passage means to the feeder passage means;

E. a second surface on the plunger upon which pressure fluid can exert force tending to move the plunger in the opposite direction to effect increase in flow of fluid from the inlet passage means to the feeder passage means;

F. and feedback duct means controlled by the valve element and rendered effective in said working position thereof to impose the pressure of service passage fluid on said second surface of the plunger.

5. A control valve having a body with inlet and feeder passage means, a service passage, and a valve element having a working position at which inlet fluid flows thereacross from the feeder passage means to the service passage, characterized by:

A. a pressure compensating valve mechanism having a fluid pressure responsive plunger to regulate such flow of inlet fluid to the service passage via the feeder passage means in accordance with variations in the pressure differential across the valve element in said working position thereof;

B. means in the plunger defining a passageway through which pressure fluid from the inlet passage means must flow in order to reach the feeder passage means;

C. a check valve arranged to pass pressure fluid from the inlet passage means to the feeder passage means but to block reverse flow therefrom to the inlet passage means;

D. means providing a feedback passageway controlled by the valve element, through which service passage pressure can be imposed on the plunger tending to shift the same in the direction to increase fluid flow from the inlet passage means to the feeder passage means in said working position of the valve element;

E. a surface on the plunger upon which pressure fluid can exert force tending to shift the plunger in the opposite direction to reduce fluid flow from the inlet passage means to the feeder passage means;

F. and means providing a second passageway through which said plunger surface can be subjected to the pressure of fluid in the feeder passage means.

6. A control valve having a body with inlet and feeder passage means, a service passage, and a valve element having a working position at which inlet fluid flows thereacross from the feeder passage means to the service passage, characterized by:

A. a pressure compensating valve mechanism having a fluid pressure responsive plunger to regulate such flow of inlet fluid to the service passage via the feeder passage means in accordance with variations in the pressure differential across the valve element in said working position thereof;

B. means in the plunger defining a passageway through which pressure fluid from the inlet passage means must flow in order to reach the feeder passage means;

C. a check valve arranged to pass pressure fluid from the inlet passage means to the feeder passage means but to block reverse flow therefrom to the inlet passage means;

D. means by which the pressure of fluid in the feeder passage means can be imposed upon the plunger to effect movement thereof in the direction to reduce fluid flow from the inlet passage means to the feeder passage means;

E. a surface on the plunger upon which pressure fluid can exert force tending to effect movement thereof in the opposite direction to increase fluid flow from the inlet passage means to the feeder passage means;

F. and means providing a feedback passage through which the pressure of fluid in the service passage can be imposed upon said plunger surface in the working position of the valve element.

7. A control valve having a body with inlet and feeder passage means, a pair of service passages, and a valve element movable from one to the other of a pair of working positions at opposite sides of a neutral position to communicate either of said pair of service passages with the feeder passage means and the other with return passage means, characterized by:

A. a pressure compensating valve mechanism having a fluid pressure responsive plunger to regulate such flow of inlet fluid to one of the service passages via the feeder passage means in accordance with variations in the pressure differential across the valve element in one of said working positions thereof;

B. means in the plunger defining a passageway through which pressure fluid from the inlet passage means must flow in order to reach the feeder passage means;

C. a check valve arranged to pass pressure fluid from the inlet passage means to the feeder passage means but to block reverse flow therefrom to the inlet passage means;

D. an outlet in the body to which inlet fluid flows in bypass relation to the feeder passage via passage defining means in the compensating plunger when the valve element is in said neutral position;

E. a second such control valve having its inlet connected to said inlet to receive pressure fluid therefrom;

F. and said outlet in the first designated control valve being communicated with one of said return passages thereof whereby the second control valve can be supplied with exhaust fluid from a fluid motor governed by the first designated control valve at times when said outlet is in communication with said one return passage.

8. A control valve having a body with inlet and feeder passage means, a pair of service passages, and a valve element having a pair of working positions at opposite sides of a neutral position at which inlet fluid flows thereacross from the feeder passage means to a selected one of said pair of service passages, characterized by:

A. a pressure compensating valve mechanism having a fluid pressure responsive plunger to regulate such flow of inlet fluid to a selected one of the service passages via the feeder passage means in accordance with variations in the pressure differential across the valve element in a selected one of said working positions thereof;

B. means in the plunger defining a passageway through which pressure fluid from the inlet passage means must flow in order to reach the feeder passage means;

C. a single check valve arranged to pass pressure fluid from the inlet passage means to the feeder passage means but to block reverse flow therefrom to the inlet passage means;

D. pressure chambers into which the opposite ends of the compensating plunger project to act as pistons therein;

E. pressure of fluid in one of said chambers tending to effect movement of the plunger in the direction to increase fluid flow from the inlet passage means to the feeder passage means, and pressure of fluid in the other chamber tending to effect movement of the plunger in the direction to decrease fluid flow from the inlet passage means to the feeder passage means;

F. signal passage means governed by the valve element and rendered effective thereby in its said working position, to communicate the selected one of said service passages with said one chamber;

G. means providing a passageway communicating said other chamber with the inlet passage means;

H. means in the body providing a low pressure passage;

I. and vent means controlled by the valve element and rendered effective thereby in a non-working position thereof to communicate said one chamber with the low pressure passage.

9. The control valve of claim 8, further characterized by:

A. said body providing part of a sectional control valve and having a surface adapted for mating engagement with a surface on another section of the valve;

B. and said vent means comprising a groove in said surface of the body.

10. A control valve having fluid supply and return passage means, feeder passage means, a service passage, and a movable valve element to communicate the supply passage means with the service passage via said feeder passage means in a working position of the valve element and to close off the service passage from the feeder and return passage means in a non-working position of the valve element, characterized by the following:

A. pressure compensating valve mechanism having a feedback chamber and a fluid pressure responsive plunger one end of which is received in the feedback chamber so that the plunger can be actuated in one direction by pressure of feedback fluid in the chamber to effect increase in fluid flow from the supply passage means to the feeder passage means, said plunger having a surface upon which fluid from the supply passage means can exert force tending to move the plunger in the opposite direction, to reduce fluid flow to the feeder passage means;

B. said control including a body comprising adjoining body sections having mating surfaces in intimate engagement with one another, and said valve element and passage means being located in one of said body sections;

C. venting passage means including a groove in one of said mating surfaces through which said feedback chamber is vented in the non-working position of the valve element;

D. and signal passage means comprising a portion of said groove, for communicating the service passage with the feedback chamber in said working position of the valve element.

11. Pressure compensating valve mechanism wherein an elongated fluid pressure actuatable valve plunger is movable axially in a valve compartment in the body of the mechanism to regulate fluid flow through said compartment from inlet means opening thereto, to a pair of outlets opening therefrom, in accordance with variations in the pressure differential across the ends of the plunger, characterized by the following:

A. said compartment providing valve actuating chambers into which the opposite ends of the plunger project;

B. a spring in one of said chambers acting on the adjacent end of the plunger to yieldingly urge the same in a direction to decrease flow of fluid from the inlet means to one of said outlets and to simultaneously increase flow of fluid from the inlet means to the other outlet;

C. means in the body providing a first passage communicating with the other chamber and through which fluid pressure force which varies in accordance with the pressure at the inlet means can be imposed upon the plunger in opposition to the spring force thereon;

D. a second passage in the body leading to the spring chamber and providing for imposition on the plunger of a fluid pressure signal force which augments the spring force on the plunger;

E. means providing a passageway which leads through an internal portion of the plunger, and through which pressure fluid from the inlet means must flow in order to reach said other outlet;

F. and a check valve in said passageway arranged to pass fluid to said other outlet but to block reverse flow from said other outlet to the inlet means.

12. The pressure compensating valve mechanism of claim 11, further characterized by:

A. the passageway through said internal portion of the plunger being coaxial therewith and including radial inlet and outlet ports which open through the wall of said plunger portion at axially spaced locations, for communication with the inlet means and said other outlet, respectively;

B. and means on the plunger in said internal portion thereof providing an annular valve seat located between said inlet and outlet ports and facing the latter, which seat is engageable by the check valve to prevent flow of fluid from said outlet port to the inlet port.

13. A control valve instrumentality having an inlet, an outlet, an open center passage connecting the inlet with the outlet, a pair of valve spools, one upstream from the other, each movable to an operating position to communicate an associated motor port with a feeder passage, and a pair of pressure compensating valve mechanisms, one for each valve spool, mounted in bores which are serially intersected by the open center passage and each having a plunger movable in a direction to establish communication of the associated feeder passage with the adjacent upstream portion of the open center passage in consequence of subjection of one end of the plunger to the pressure of fluid in the associated motor port when the latter is in communication with its associated feeder passage, characterized by:

A. the upstream one of said plungers being incapable of restricting the open center passage and consequently incapable of effecting build up in pressure in the upstream portion of the open center passage when in position communicating the latter with the associated feeder passage;

B. the other plunger having means thereon to effect restriction of the open center passage when moved in the direction to communicate the adjacent upstream portion thereof with the associated feeder passage;

C. and means operable to subject said end of said other plunger to the pressure of fluid in the motor port associated with the upstream plunger in said operating position of the upstream one of said valve spools.

14. A control valve as set forth in claim 13, wherein said last named means comprises passage means extending through an internal portion of the downstream valve spool.

15. The control valve instrumentality of claim 13, further characterized by:

A. a pressure chamber into which said end of said other plunger projects to act as a piston therein;

B. said last named means comprising passage means which leads from the motor port associated with the upstream plunger to said pressure chamber;

C. and a shuttle valve governing flow through said passage means, and arranged to preclude reverse flow of pressure fluid from said pressure chamber toward the motor port associated with the upstream plunger.

16. A control valve instrumentality having an inlet, and outlet, an open center passage connecting the inlet with the outlet, a pair of valve spools, one upstream from the other, each movable to an operating position to communicate an associated motor port with a feeder passage, and a pair of pressure compensating valve mechanisms, one for each valve spool, mounted in bores which are serially intersected by the open center passage and each having a plunger movable in a direction to establish communication of the associated feeder passage with the adjacent upstream portion of the open center passage in consequence of subjection of one end of the plunger to the pressure of fluid in the associated motor port when the latter is in communication with its associated feeder passage, characterized by:

A. said plungers being incapable of restricting the open center passage and consequently incapable of effecting buildup in pressure in the open center passage when in position communicating their respective upstream open center passage portions with their associated feeder passages;

B. a third plunger which extends across the open center passage downstream from the first designated plungers and has means thereon to restrict or even block flow therethrough upon movement of said third plunger in one direction;

C. and means operable at times when either of said motor ports is in communication with its associated feeder passage, for translating the pressure of feeder passage fluid in said motor port into a force on said third plunger that is effective to move the same in said direction to restrict the open center passage.

17. The control valve instrumentality of claim 16, further characterized by:

A. a pressure chamber into which one end of said third plunger projects to have said force imposed thereon;

B. said last named means comprising passage means which leads from each of said motor ports to said chamber;

C. and a shuttle valve actuatable by pressure fluid in the downstream motor port at a value greater than that of pressure fluid in the upstream motor port to a position closing off communication between the upstream motor port and said chamber.

* * * * *